(No Model.)
2 Sheets—Sheet 1.
H. A. WAHLERT.
HOSE COUPLING.
No. 383,160.
Patented May 22, 1888.
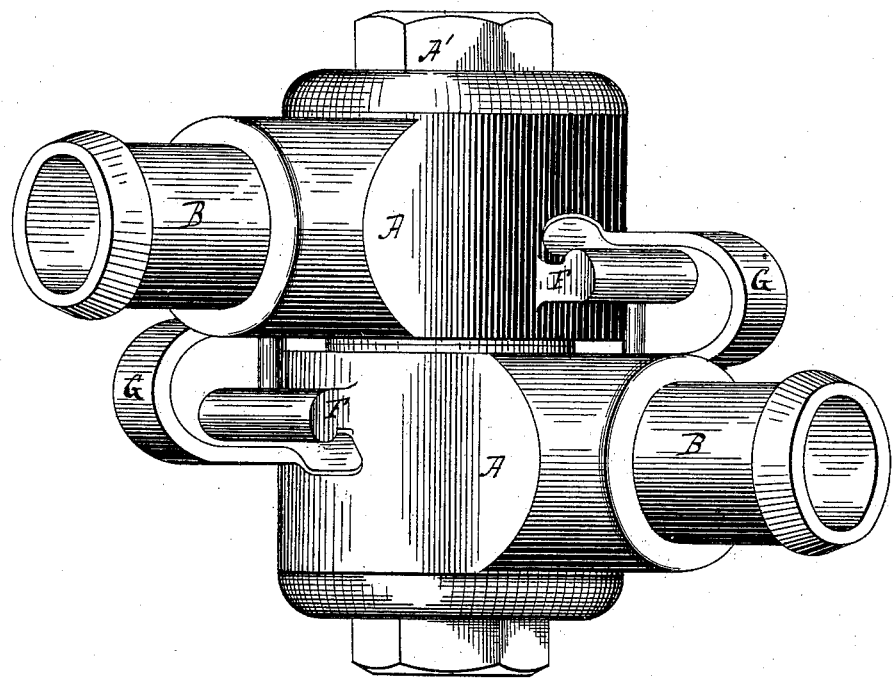
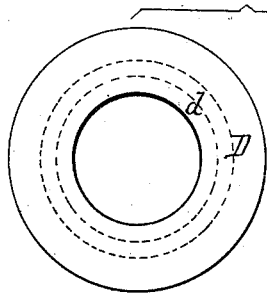
Fig. 2.
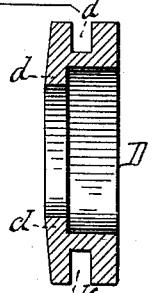
Fig. 1.
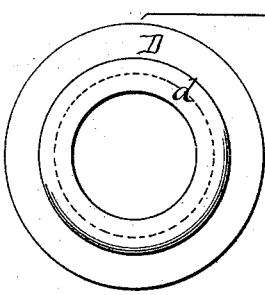
Fig. 3.
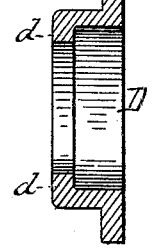
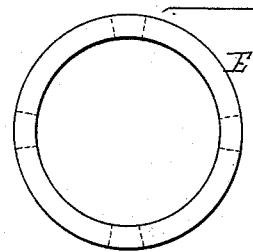
Fig. 4.
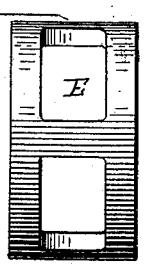
Witnesses.
G. W. Tauberschmidt
H. B. Moulton
Inventor,
Henry A. Wahlert,
By his Attorney F. W. Ritter Jr.

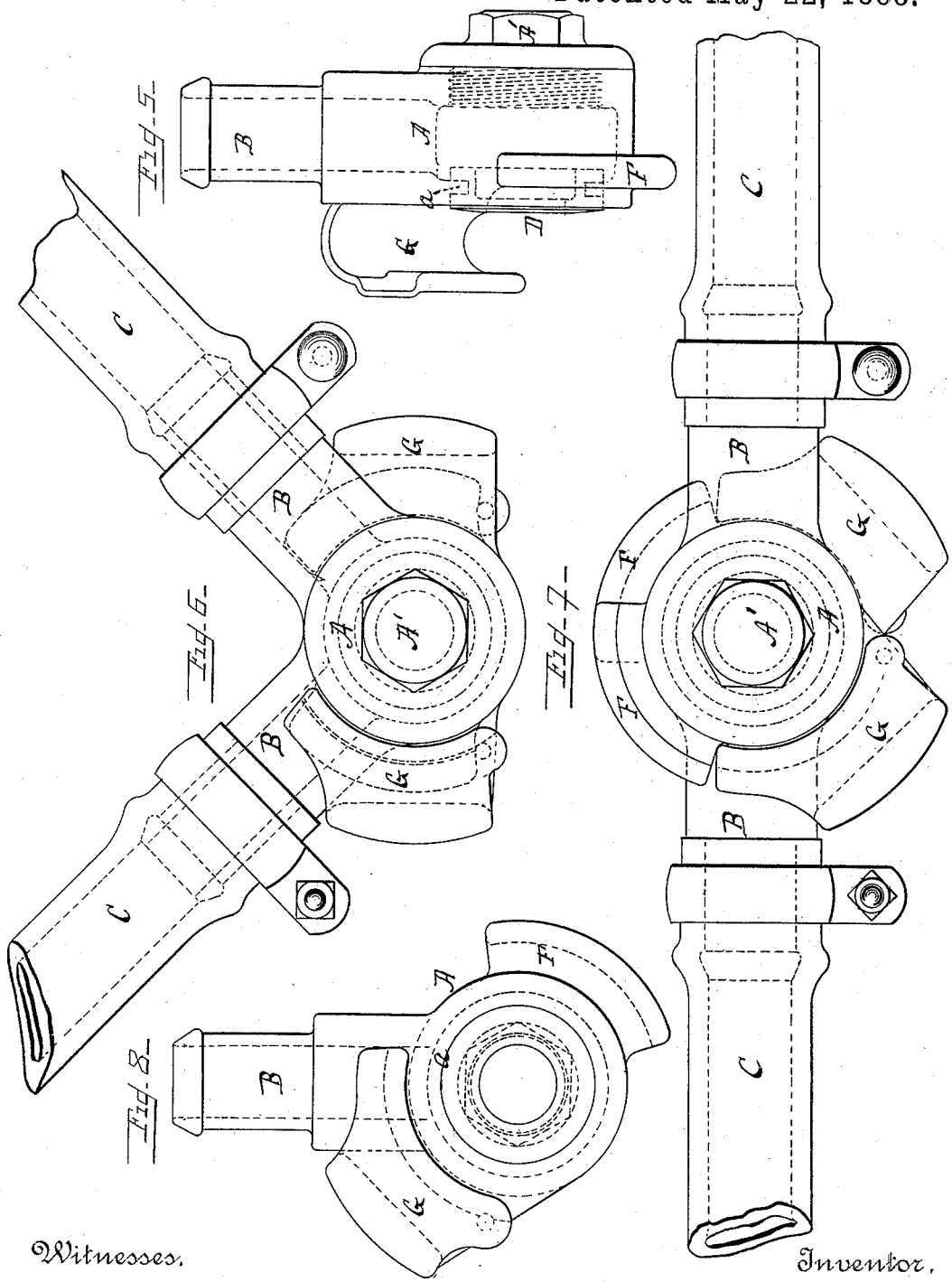

UNITED STATES PATENT OFFICE.

HENRY A. WAHLERT, OF ST. LOUIS, MISSOURI, ASSIGNOR TO THE AMERICAN BRAKE COMPANY, OF SAME PLACE.

HOSE-COUPLING.

SPECIFICATION forming part of Letters Patent No. 383,160, dated May 22, 1888.

Application filed November 7, 18.7. Serial No. 254,530. (No model.)

*To all whom it may concern:*

Be it known that I, HENRY A. WAHLERT, a citizen of the United States, residing at St. Louis, in the State of Missouri, have invented certain new and useful Improvements in Hose-Couplings; and I hereby declare the following to be a full, clear, and exact description of the same.

This invention relates to that class of devices for coupling the flexible ends of air-brake pipes in railway-cars wherein a half-coupling is used on each pipe end.

In couplings of this character now known the locking-lug and keeper on each half-coupling are arranged on opposite sides of the air port or opening in the coupling and substantially in line with the stub-tube to which the flexible pipe end is connected. This is objectionable for the reason that when two cars are coupled the sag of the connected pipe ends causes the half-couplings to turn upon each other to such an extent that the locking-lugs are liable to escape from under their keepers, thus disengaging the coupling unless some special means are provided to prevent the same. A further objection to this class of couplings is that in disengaging the couplings automatically (by the pulling apart of two cars which have been coupled) the meeting faces of the rubber gaskets or packing-rings in the opposite half-couplings are subjected to violent friction, which soon renders them unfit for use.

The object of my invention is to overcome these objections and provide a coupling that will automatically lock and remain locked when the couplings sag, and will automatically disengage by the rotation of the couplings when the pipes are drawn taut in case of the uncoupling of the cars or the parting of the train; and to this end my invention consists in the combination of two half-couplings, each having a hollow body provided with a stub-tube coincident with the radius thereof and a lug and keeper arranged diametrically opposite each other on radial lines of the body, the radial line of the keeper or of the lug being at such angle to the radial line of the stub as will cause the lugs and keepers to disengage when the axial lines of the stubs substantially coincide, and also in a half-coupling having the characteristics before specified for each section, all as will hereinafter more fully appear.

There are also other minor points of invention, which will hereinafter more fully appear.

I will now proceed to describe my invention more specifically, so that others skilled in the art to which it appertains may apply the same.

In the accompanying drawings, Figure 1 is a plan view of the united half-couplings. Fig. 2 illustrates in plan and section one form of gasket or packing-ring. Fig. 3 is a similar illustration of a modified form thereof. Fig. 4 illustrates in plan and elevation the skeleton ring for supporting the gasket. Fig. 5 is a side view of one of the half-couplings. Fig. 6 is a side elevation of the two half-couplings united, showing the position assumed when the pipes are coupled. Fig. 7 is a similar view showing the position of the two half-couplings and their pipe ends at the moment of automatic disengagement. Fig. 8 is a face view of one of the half-couplings.

The same letters of reference are used in all the figures to designate the same parts.

Each half-coupling consists of a body, A, and stub-tube B, of usual form, the flexible end of the air-pipe C being secured upon the stub-tube, as is usual. The body A is provided with a transverse passage intersecting the passage of the stub-tube, an annular flange, $a$, being formed at the inner end of the passage, against which is seated a rubber gasket, D. The gasket is held to its seat by a skeleton ring, E, which in turn is supported by a screw-plug, A', which closes the outer end of the passage.

The parts so far named are similar in general form and construction to those of similar devices now known, except in the particulars hereinafter described.

The outer end of the gasket D is provided with an inwardly-projecting flange, $d$, (see Figs. 2 and 3,) designed to abut against a similar flange of the gasket in the other half-coupling, the purpose being to construct these flanges so light or flexible that the air-pressure will force their meeting faces in intimate contact. It may be here stated that in some instances I contemplate tapering these flanges $d$ to a feather-edge to render them more sensitive to air-pressure. It has been found in practice that owing to the weight of couplings of this character the flexible ends C of the pipes on two adjacent cars, when coupled, will droop or sag, assuming an angle with relation to each other of forty-five degrees, (more or less,) the half-couplings turning upon each other to assume the same position. In consequence of this, I have arranged the locking-lugs F and keepers G diametrically opposite and on lines radiating from the axial center of the body A, and at such an angle with relation to the stub-tubes B, which stub-tubes have their longitudinal axes on radial lines of the body A, that the tendency of the pipe ends to sag will cause said locking-lugs and keepers to engage or interlock, as shown in Figs. 1 and 6, and retain this position until longitudinal strain is put upon the hose, (as in pulling cars apart,) which action will cause the straightening of the hose, thus turning the half-couplings on each other, bringing the longitudinal axes of the stub-tubes coincident and freeing the lugs F from the keepers G, as in Fig. 7, so that the half-couplings will fall apart, and this without undue strain on the flexible connections.

In Fig. 2 I have shown a form of gasket that may be used without the supporting-ring E, as the circumferential groove $d'$ is designed to receive the flange $a$ at the inner end of the passage of the body A of the coupling, and as there is no strain on the gaskets in uncoupling, nor no spring or compression or yielding of the gaskets required in coupling the lock, such a construction or form of gasket will be found perfectly effective.

It will be noted that the longitudinal axial line of the stub-tube or nozzle B of the coupling is coincident with a radius of the half-coupling A; but such axial line is in such relation to a line drawn from the center of a lug, F, across the disk to the center of the opposite lug or keeper G that when the half-disks are coupled and the hose-pipe is drawn taut the disks are rotated to a point where the lug becomes disengaged from the lip or keeper, and the halves of the coupling are separated without compressing the gaskets.

Having thus described my invention, what I claim, and desire to secure by Letters Patent, is—

1. A half-coupling having a lug and a keeper diametrically opposite and on radial lines of the body thereof, and a stub-tube whose longitudinal axis is coincident with the radius of the body and intersects the radial lines on which the lug and keeper are arranged, substantially as and for the purposes specified.

2. In a hose-coupling, the combination of two half-couplings, each of which has a hollow body, a lug, and a keeper arranged on radial lines of the body and opposite each other, and a stub-tube whose longitudinal axis coincides with a radius of the body and intersects the radii of the lug and keeper, which will cause the lugs and keepers to disengage when the longitudinal axial lines of the stubs substantially coincide, substantially as and for the purposes specified.

In testimony whereof I affix my signature, in presence of two witnesses, this 4th day of November, 1887.

HENRY A. WAHLERT.

Witnesses:
E. L. ADREON,
JNO. R. WILLIAMS.